Figure 6:
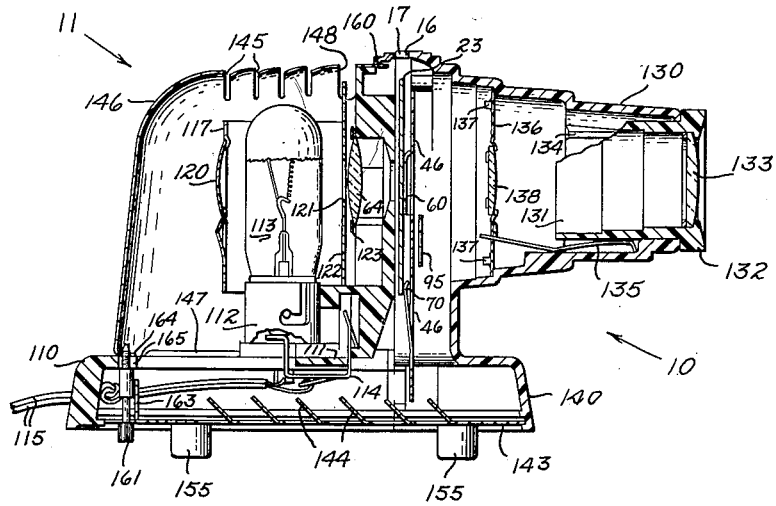

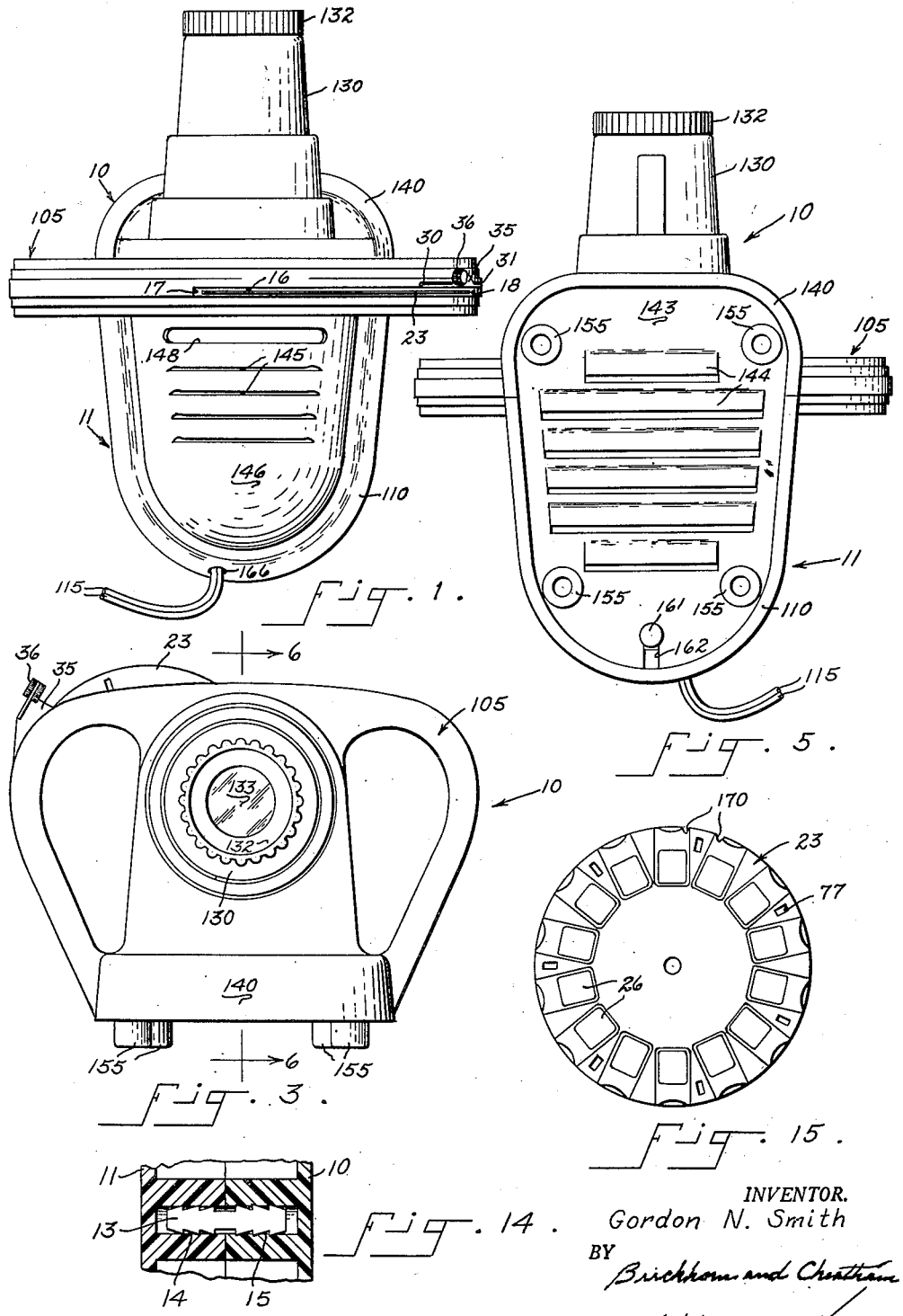

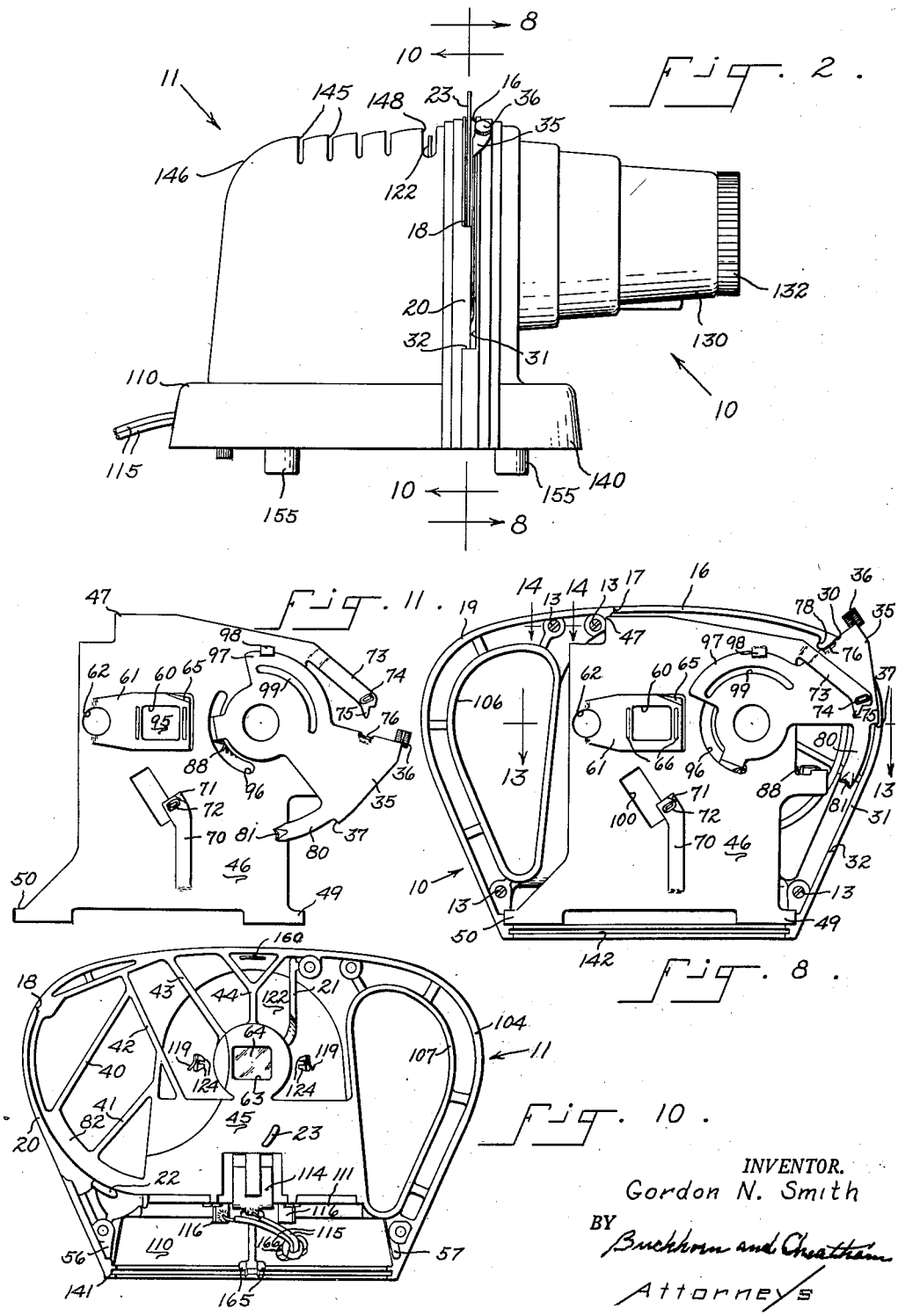

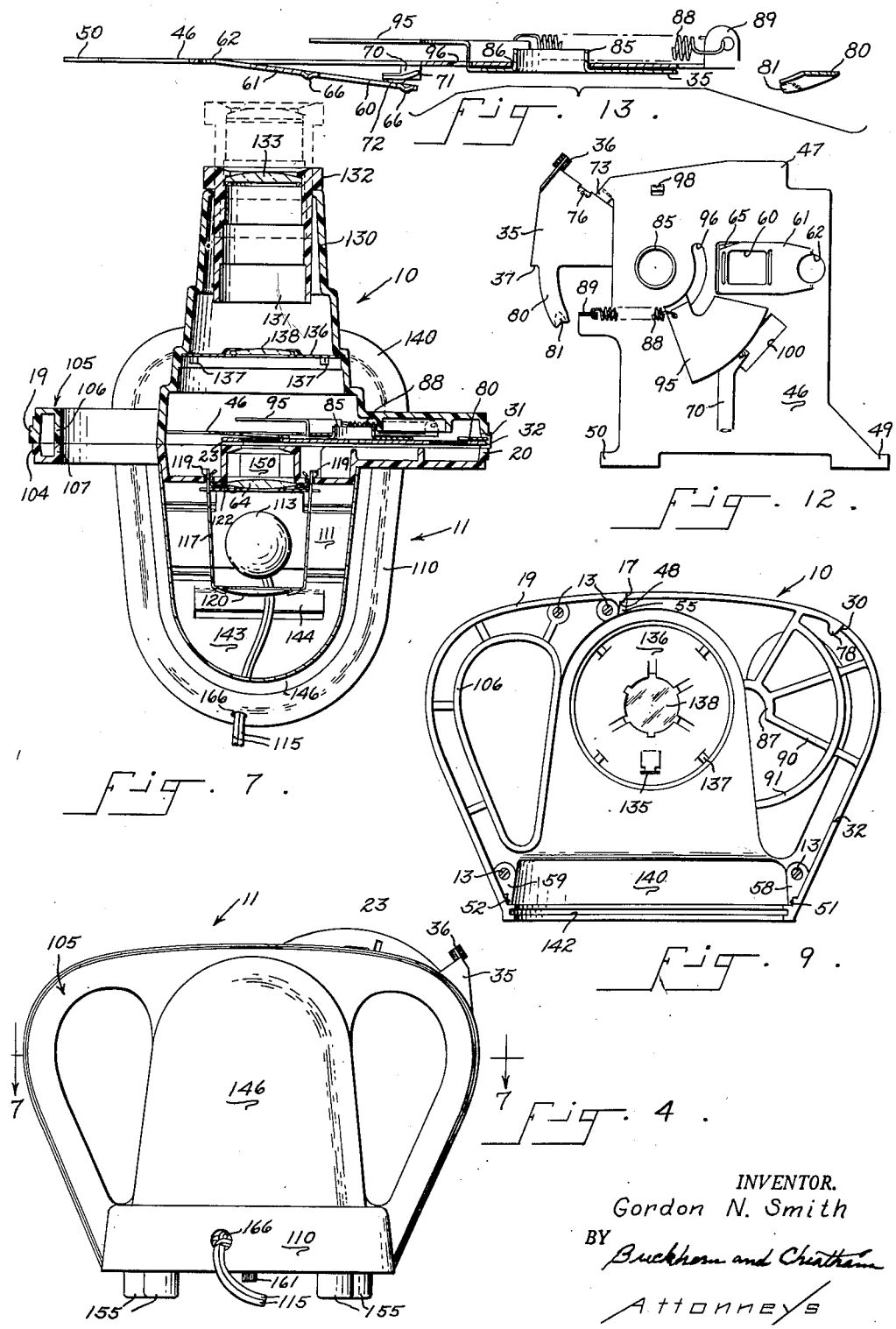

Jan. 13, 1953

G. N. SMITH 2,625,078

DEVICE FOR PROJECTING SINGLE VIEWS OF
STEREOSCOPIC PAIRS MOUNTED IN DISKS

Filed May 5, 1950

4 Sheets-Sheet 4

INVENTOR.
Gordon N. Smith
BY
Buckhorn and Cheatham
Attorneys

Patented Jan. 13, 1953

2,625,078

UNITED STATES PATENT OFFICE 2,625,078

DEVICE FOR PROJECTING SINGLE VIEWS OF STEREOSCOPIC PAIRS MOUNTED IN DISKS

Gordon N. Smith, Portland, Oreg., assignor to Sawyer's Inc., Portland, Oreg., a corporation of Oregon Application May 5, 1950, Serial No. 160,272

10 Claims. (Cl. 88—27)

The present invention comprises an improvement in apparatus for projecting transparency views onto a screen, utilizing a transparency holding disc such as disclosed and claimed in the patent to Gruber, No. 2,189,285, issued February 6, 1940. In the above-identified patent, and in the copending application of Gruber, Serial No. 744,349, filed April 28, 1947, now Patent No. 2,511,334, issued June 13, 1950, it is disclosed that pairs of transparencies may be mounted in a view holding disc which may be slid downwardly into a slot in a stereoscopic viewer which is to be held to the eyes of the user in order that the matched stereoscopic views may be observed through light tunnels provided in the viewer. In many instances the subjects of the views may be used to illustrate classroom lectures, travelogues and the like, for which purpose it would be inconvenient to provide an individual viewer for each member of the audience so that a projector capable of projecting the views onto a screen is desirable. The present invention provides a relatively inexpensive projector designed to project one transparency of each pair onto a screen in order that the advantages of two-dimentional projection might be obtained with the minimum of equipment. An object of the present invention, therefore, is to provide a relatively inexpensive projector capable of projecting one of each pair of views mounted in transparency holding discs designed for stereoscopic use.

A further object of the present invention is to provide an improved disc advancing mechanism for use in apparatus capable of receiving transparency holding discs of the type in question.

A further object of the present invention is to provide a non-stereoscopic projector having provision for retaining a disc in eccentric relation to the axis of projection and including step-by-step feeding mechanism comprising a laterally projecting lever, in which the projector is provided with convenient holding means whereby the projector may be maintained in correct position by the hand of the operator other than the hand required to place and remove discs and to operate the feeding lever.

Other objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawing,

Fig. 1 is a plan view of a projector made in accordance with the present invention;

Fig. 2 is a side elevation of the projector;
Fig. 3 is a front elevation of the projector;
Fig. 4 is a rear elevation of the projector;
Fig. 5 is a bottom view of the projector;
Fig. 6 is a vertical, longitudinal section taken substantially along line 6—6 of Fig. 3;
Fig. 7 is a horizontal section taken substantially along line 7—7 of Fig. 4;
Fig. 8 is a vertical section looking forward substantially from the plane of line 8—8 of Fig. 2, showing the feeding mechanism in position;
Fig. 9 is a view similar to Fig. 8, with the feeding mechanism removed;
Fig. 10 is a view looking rearwardly substantially from the plane of line 10—10 of Fig. 2;
Fig. 11 is a view of the feeding mechanism alone with the feeding lever advanced;
Fig. 12 is a view of the front face of the feeding mechanism with the feeding lever retracted as seen in Fig. 8;
Fig. 13 is a horizontal section, on an enlarged scale, taken substantially along line 13—13 of Fig. 8;
Fig. 14 is a horizontal section taken substantially along line 14—14 of Fig. 8; and
Fig. 15 is a view of the side of a transparency holding disc which faces the lamp when employed in the projector.

The projector comprises a frame including a front part 10 and a rear part 11, the frame being formed of molded plastic or other suitable material. The two frame parts are separable substantially along the line 8—8 of Fig. 2 and are retained in assembly relationship by blind fasteners 13 (Figs. 8 and 14) having oppositely directed barbs to retain the fasteners in suitable opposed bores such as indicated at 14 and 15 (Fig. 14). There are four such fasteners provided, two at one side of the top of the frame and one at each side of the bottom of the frame. More could be provided if desired, but the number disclosed has been found sufficient to retain the two halves of the frame in face-to-face relation. The upper fasteners are located to one side of a disc receiving slot 16, the ends of which are defined by an abutment 17 defining the end of a rearwardly projecting flange 19 on the front part and an abutment 19 defining the end of a forwardly projecting flange 20 on the rear part. The flange 19 continues on around the side of the projector to the bottom of the front half, and the flange 20 continues down the opposite side of the projector toward the bottom of the rear part 11. A vertical rib 21 extends from near the top of the rear part 11 a short distance downwardly to define one side of an internal pocket, the other side of which is defined in part by flange 20, which is substantially arcuate, and terminates at a forwardly projecting lug 22. Beneath the rib 21 there is a forwardly projecting lug 23, defining with the flange 20 the bottom of the pocket against which the outer edge of the transparency holding disc 25 is guided as it is rotated step by step to bring one of each pair of opposed transparencies 26 into alignment with the axis of projection. The forward edge of the slot 16 is recessed slightly to provide an abutment 30 spaced above the abutment 18, and an offset continuation 31 of the slot 16, the lower limit thereof being defined by an abutment 32 at the upper end of a rearwardly projecting flange on the front half of the frame. The abutment 30 engages the upper edge of a feeding lever 35 which projects through the slot 31 to limit upward movement thereof as effected by spring means (to be described), and the lever may be moved downwardly by engaging a finger knob 36 thereon until a projection 37 on the lever engages the upper end of the lug 22 to limit downward movement of the lever to substantially 51° 26′ whereby alternate ones of the seven pairs of transparencies are brought into projecting position.

The transparency is retained against a plurality of ribs such as ribs 40, 41, 42, 43 and 44 and against a flat surface 45 of the rear half, being pressed thereagainst by a plurality of spring means 61, 70 and 73 integral with a lever mounting plate 46 retained in the front half forwardly of the edge thereof defining the slots 16 and 31. In order to retain the plate 46 in position an upper corner thereof designated at 47 is received in a small notch 48 in part 10, and lower feet thereon, designated at 49 and 50, are received in notches designated at 51 and 52 in part 10, respectively. The vertical rib 21 on the rear part 11 engages the portion 47 of the mounting plate to retain it against a surface 55 of the front portion, and flanges 56 and 57, respectively, of the rear part engage the feet 49 and 50, respectively, to press them against vertically aligned surfaces 58 and 59, respectively, on the front part so that when the two frame halves are slipped together the mounting plate 46 is immovably retained vertically within the frame forwardly of the slot 16.

The mounting plate is provided with an opening 60 which is aligned with the axis of projection and is formed in a rearwardly bent tongue 61 struck from the plate, the attached end thereof being partially cut away by a hole 62. The plate is made of thin, resilient material, such as spring steel, which may be pre-set so that the tongue 61 tends to press rearwardly against the opposite surface 45 of the rear frame part, a portion of which surrounds a framing aperture 63 through which a condenser lens 64 may be seen. The hole 62 reduces the width of the attached portion of the tongue so as to decrease the force required to depress the tongue toward the plane of the mounting plate 46. The upper corner of the free end of tongue 61 is bent inwardly toward the plate as indicated at 65 so that as the lower edge of a disc being inserted engages the inwardly bent portion the tongue will be depressed by the disc. Preferably a pair of raised, vertical ridges 66 are provided at the sides of the opening 60 so as to prevent engagement of any portion of the tongue with the transparencies themselves rather than with the material of the holding disc. The tongue presses the portion of the disc surrounding the view against the wall of the slot so as to hold the film in the proper plane.

The mounting plate 46 is also provided with a pair of retaining fingers. One of the fingers is indicated at 70 as extending upwardly toward the framing aperture, the upper tip thereof being bent toward the plane of the mounting plate as indicated at 71, there being an elongated retaining lug 72 struck upwardly from the end of the retaining finger. The other retaining finger 73 extends downwardly and laterally from the upper edge of the mounting plate adjacent the abutment 36. The end of the finger 73 is provided with a retaining lug 74, and the finger terminates in a downwardly directed, pointed tip 75. The finger 73 is bent forwardly from the plane of the plate 46 so as to overlie the operating lever 35 and the operating lever is provided with a depression 76 in its upper edge which slides beneath the pointed tip 75 to prevent the retaining finger from catching the lever as it is being returned to its normal position. The lugs 72 and 74 are elongated in a radial direction from the pivotal axis of the operating lever so as to be engageable in elongated, radial slots 77 in the transparency mounting disc 25, the angular spacing of the two lugs being such as to engage a substantially opposed pair of the feeding openings and thus retain the transparency in alignment with the framing aperture 60. The depression 76 also serves another purpose in that it engages a downwardly projecting boss 78 beneath the abutment 30 positively to prevent the lever 35 from traveling beyond the desired upper limit of movement. Feeding movement of the disc is effected through a downwardly directed, arcuate feeding extension 80 of the lever 35, the tip of which is struck upwardly to provide a claw 81 engageable with the feeding apertures 77. The rear frame part 11 is provided with an arcuate plane surface 82 over which the claw may slide when the disc has been removed from the pocket.

The lever 35 is pivotally mounted on the plate 46, being provided for this purpose with a centrally located, annular flange 85 which passes through a round opening 86 in the mounting plate, the inner end thereof being partially surrounded by an arcuate flange 87 on the inner surface of the front part 10. The lever is returned to its normal position by a spring 88 having one end anchored in an ear 89 projecting from plate 46 into the angular space between flanges 90 and 91 on the front part. The opposite end of spring 88 is hooked into a shutter extension 95 of the operating lever which is provided with a narrow neck portion bent rearwardly from the plane of the lever and passing through an arcuate slot 96 concentrically related to pivot aperture 86. The shutter 95 normally lies below the framing aperture 60 but when the operating lever is depressed it is moved upwardly to block the passage of light through the projector so as to block out the light during feeding movement of the reel. The upper edge of the operating lever 35 is provided with an arcuate flange 97 which is engaged beneath a tongue 98 struck from the surface of the mounting plate to prevent the operating lever from tipping out of its retaining aperture. The tongue 98 projects downwardly so as not to catch a disc when being inserted, and the flange 97 is provided with an arcuate ridge 99 underlying the tip of the tongue at all times so as to prevent catching any portion of the disc.

An opening 100 is provided in the mounting plate 46 through which the lug 23 projects.

The flange 19 on the front part abuts a matching flange 104 on the rear part to define the outer surface of a handle 105 by means of which the projector may be held against the top of a table or the like while the operating lever is being actuated. The flange 19 is paralleled by the outer edge of a hand hole defining flange 106 which abuts a matching flange 107 in the rear half, the inner portions of the flanges 106 and 107 defining a portion of the wall of the enclosed space. The hand hole thus defined tapers downwardly conveniently to receive the fingers of the left hand when the left forearm rests on a table alongside of, and to the rear of, the projector, thus providing means to brace the projector against displacement during operation.

The rear frame part 11 comprises the vertical portion including the surface 45 and a horizontal, U-shaped bottom portion 110 across which there extends a bridge 111, the central portion of which supports a bulb socket 112 in which is mounted a bulb 113. A spring contact member 114 is retained in a suitably formed portion of the frame and extends beneath the bridge 111, being provided with a finger projecting upwardly into the bottom of the socket to engage the lower tip of the bulb, one of a pair of wires 115 being soldered to the spring contact member. The other wire is soldered to one of a pair of tabs 116 depending from the socket through slots in the bridge portion and twisted to retain the socket in position. The bulb is enclosed at its sides and at its rear by a U-shaped shield 117 having tabs 119 projecting through the vertical wall of the frame part 11 and twisted to retain the shield in position. A concave reflector 120 is mounted in an aperture in the rear wall of the shield and retained by tabs thereon, the reflector concentrating a beam of light forwardly through an aperture 121 in a front reflector shield 122 spanning the side walls of the shield 117. The condenser lens 64 is retained in a recess through the vertical wall of the rear part 11 by means of a retainer ring 123 having deformable tabs 124 extending through the wall thereof, the recess terminating in the rectangular aperture 63 in line with the framing aperture 60 on the mounting plate.

The front part 10 comprises a forwardly projecting, tubular portion 130 in which is telescopically mounted a lens sleeve 131, the sleeve being provided with a ribbed end flange 132 in which is mounted the outer lens 133. The sleeve is movable between longitudinally extending inner guides 134 (Fig. 6) in the portion 130, and a spring 135 which presses the sleeve against the guides and holds the sleeve in axial alignment with the light beam. The inner end of the spring 135 projects through, and is anchored in, a disc 136 having a plurality of notches in its periphery which engage a plurality of spaced lugs 137 in the inner surface of the tube, the side edges of the notches being so arranged as to provide resilient tongues which grip the lugs and hold the disc 136 against displacement from its seat on an internal flange of the tube. An intermediate lens 138 is retained in a central aperture in the disc 136.

The lower portion of the front part 10 is provided with a depending flange 140 which complements the depending flange 110 of the rear portion to define a base. The flange 110 is provided with a groove 141 and the flange 140 is provided with a matching groove 142 adapted to embrace the periphery of a bottom plate 143 in which are provided a plurality of slots, the slots being formed by striking louvers 144 inwardly from the plate. The louvers are directed rearwardly so as to direct most of the air entering the interior toward the rear of the apparatus so that it may flow forwardly across the bulb on its way to a plurality of louvered slots 145 in a lamp housing 146 formed of sheet metal. The lamp housing is open at the bottom, and the bottom edge thereof embraces flanges 147 on top of the portion 110 of the rear frame part. Air may circulate freely along both sides of the intermediate shield 122 which terminates beneath a large open slot 148 in the top of the lamp housing. Air may also circulate through an opening 150 (Fig. 7) in the bottom of the recess in which the condenser lens 64 is located, the air passing from the aperture through an opening in the rear frame part between the ribs 44 and 21, thus cooling the film and the front surface of the condenser lens by a stream of air which may pass from the lamp housing through the wide slot 148. Cooling air may also traverse the transparency holding disc and both surfaces of the mounting plate 46, the air escaping upwardly through the disc inserting slot 16.

The bottom plate 143 supports a plurality of resilient feet 155 designed to prevent marring of the furniture upon which the apparatus is positioned.

The lamp housing 146 is provided with a forwardly projecting, central tongue 160 at its upper edge which projects through a slot in the rear frame part 11. The lamp housing is locked in position by the threaded end of a knurled screw 161, the head of which engages the edges of a slot 162 in the rear edge of the bottom plate, the material defined by the edges of the slot being struck upwardly to define a tongue 163 which serves to direct the threaded end of the screw upwardly into an aperture in a lug 164 extending forwardly from the bottom edge of the lamp housing. The intermediate portion of the screw 161 is enlarged to provide a flange which may bear against the tongue 163. The wires 115 are led outwardly through a hole 166 in the rear wall of the flange 110.

In operating the device, the operator may select a disc and, even though the room is darkened, may insert it into the slot 16 in substantially proper relation to show the first of a series of seven views by feeling a pair of edge notches 170 in the periphery of the disc 25 which are so arranged as to be uppermost when the first view is in alignment with the framing aperture. Lever 36 may then be operated to align the first views. Sufficient light is projected through the wide slot 148 so that he may read legends printed on the disc prior to inserting the disc in the apparatus if he needs to refresh his memory. When the disc is so inserted the lugs 72 and 74 engage a pair of the feeding apertures 77 to hold the disc in proper position. When the next view is desired the finger knob 36 is manually depressed until the projection 37 strikes the lug 22, at which point the lugs 72 and 74 engage the next pair of feeding apertures 77 to prevent the feeding lever from returning the disc. When all views have been shown the upper edge of the disc is grasped and the disc removed upwardly from the slot 16.

Having illustrated and described a preferred embodiment of the invention, it will be apparent to those skilled in the art that the invention permits of modification in arrangement and detail. I claim as my invention all such modifications as come within the true spirit and scope of the appended claims.

I claim:

1. A device for projecting views of transparencies mounted in a circle about the outer portion of a disc, comprising a frame having a first slot in its upper surface and means defining with said slot an upwardly opening pocket into which a transparency holding disc may be inserted, projecting means mounted in said frame, the line of projection thereof being substantially along the longitudinal center line of the frame and said pocket being eccentrically located with respect to the line of projection and lying in a plane substantially normal thereto so that the transparencies may be brought into the line of projection by rotating the disc in the pocket, feeding means mounted in said frame and including a lever projecting through a second slot in the side of said frame, said lever being mounted for pivotal movement about an axis normal to the plane of said pocket substantially coinciding with the center of said disc when located in said pocket and having a portion engageable with said disc to rotate the disc step by step upon successive actuations of the lever in one direction, spring means associated with said lever for returning said lever to a normal position, spaced abutments engageable by said lever for limiting movement of said lever to the amount required to position successive views in alignment with said projecting means, and means engaging said disc to hold said disc against returning movement with said lever when being returned, said frame comprising a front part and a rear part and means for holding said parts together, said parts having substantially vertical, matching portions meeting substantially in the plane of said pocket, and said feeding mechanism comprising a mounting plate associated with said frame parts, one of said frame parts having recesses for receiving widely spaced portions of said mounting plate and the other of said frame parts having lugs engageable with said widely spaced portions to retain them in said recesses.

2. A device for projecting views of transparencies mounted in a circle about the outer portion of a disc, comprising a frame having a first slot in its upper surface and means defining with said slot an upwardly opening pocket into which a transparency holding disc may be inserted, projecting means mounted in said frame, the line of projection thereof being substantially along the longitudinal center line of the frame and said pocket being eccentrically located with respect to the line of projection and lying in a plane substantially normal thereto so that the transparencies may be brought into the line of projection by rotating the disc in the pocket, feeding means mounted in said frame and including a lever projecting through a second slot in the side of said frame, said lever being mounted for pivotal movement about an axis normal to the plane of said pocket substantially coinciding with the center of said disc when located in said pocket and having a portion engageable with said disc to rotate the disc step by step upon successive actuations of the lever in one direction, spring means associated with said lever for returning said lever to a normal position, spaced abutments engageable by said lever for limiting movement of said lever to the amount required to position successive views in alignment with said projecting means, and means engaging said disc to hold said disc against returning movement with said lever when being returned, said feeding means comprising a mounting plate retained in said frame in a vertical plane closely adjacent one edge of said disc receiving slot, said lever being pivotally mounted upon said mounting plate, and said spring being tensioned between a portion of said mounting plate and said lever.

3. A device for projecting views of transparencies mounted in a circle about the outer portion of a disc, comprising a frame having a first slot in its upper surface and means defining with said slot an upwardly opening pocket into which a transparency holding disc may be inserted, projecting means mounted in said frame, the line of projection thereof being substantially along the longitudinal center line of the frame and said pocket being eccentrically located with respect to the line of projection and lying in a plane substantially normal thereto so that the transparencies may be brought into the line of projection by rotating the disc in the pocket, feeding means mounted in said frame and including a lever projecting through a second slot in the side of said frame, said lever being mounted for pivotal movement about an axis normal to the plane of said pocket substantially coinciding with the center of said disc when located in said pocket and having a portion engageable with said disc to rotate the disc step by step upon successive actuations of the lever in one direction, spring means associated with said lever for returning said lever to a normal position, spaced abutments engageable by said lever for limiting movement of said lever to the amount required to position successive views in alignment with said projecting means, and means frictionally engaging said disc to hold said disc against returning movement with said lever when being returned, said feeding means comprising a mounting plate retained in said frame in a vertical plane closely adjacent one edge of said disc receiving slot, said lever being pivotally mounted upon said mounting plate, said mounting plate comprising a thin sheet of spring material, and said retaining means comprising a plurality of fingers struck from said mounting plate and normally projecting into said pocket.

4. A device for projecting views of transparencies mounted in a circle about the outer portion of a disc, comprising a frame having a first slot in its upper surface and means defining with said slot an upwardly opening pocket into which a transparency holding disc may be inserted, projecting means mounted in said frame, the line of projection thereof being substantially along the longitudinal center line of the frame and said pocket being eccentrically located with respect to the line of projection and lying in a plane substantially normal thereto so that the transparencies may be brought into the line of projection by rotating the disc in the pocket, feeding means mounted in said frame and including a lever projecting through a second slot in the side of said frame, said lever being mounted for pivotal movement about an axis normal to the plane of said pocket substantially coinciding with the center of said disc when located in said pocket and having a portion engageable with said disc to rotate the disc step by step upon successive actuations of the lever in one direction, spring means associated with said lever for returning said lever to a normal position, spaced abutments engageable by said lever for limiting movement of said lever to the amount required to position successive views in alignment with said projecting means, and means frictionally engaging said disc to hold said disc against returning movement with said lever when being returned, said feeding means comprising a mounting plate retained in said frame in a vertical plane closely adjacent one edge of said disc receiving slot, and a lever pivotally mounted upon said mounting plate, said mounting plate having an aperture therethrough and said operating lever having an annular flange thereon journalled in said aperture.

5. A device for projecting views of transparencies mounted in a circle about the outer portion of a disc, comprising a frame having a first slot in its upper surface and means defining with said slot an upwardly opening pocket into which a transparency holding disc may be inserted, projecting means mounted in said frame, the line of projection thereof being substantially along the longitudinal center line of the frame and said pocket being eccentrically located with respect to the line of projection and lying in a plane substantially normal thereto so that the transparencies may be brought into the line of projection by rotating the disc in the pocket, feeding means mounted in said frame and including a lever projecting through a second slot in the side of said frame, said lever being mounted for pivotal movement about an axis normal to the plane of said pocket substantially coinciding with the center of said disc when located in said pocket and having a portion engageable with said disc to rotate the disc step by step upon successive actuations of the lever in one direction, spring means associated with said lever for returning said lever to a normal position, spaced abutments engageable by said lever for limiting movement of said lever to the amount required to position successive views in alignment with said projecting means, and means engaging said disc to hold said disc against returning movement with said lever when being returned, said feeding means comprising a mounting plate retained in said frame in a vertical plane closely adjacent one edge of said disc receiving slot, and a lever pivotally mounted upon said mounting plate, said operating lever being pivotally mounted upon said mounting plate and comprising a shutter extension, and said mounting plate having a framing aperture therethrough in line with said projecting means, said shutter extension normally underlying said framing aperture and being movable to block the passage of light therethrough upon actuation of said operating lever.

6. Apparatus for projecting single views of transparencies mounted circumferentially of a view carrying disc, comprising a casing having a narrow pocket therein into which a disc may be inserted, a bulb mounted in said casing rearwardly of said pocket, lens means mounted in said casing along a line normal to said pocket, said lamp and lens means being arranged to project said transparencies onto a screen, means in said casing for rotating said disc step by step about its center including a manually engageable lever projecting from said casing, a claw on said lever for engaging said disc to accomplish rotative movement of said disc during movement of said lever in one direction, spaced abutments on said casing engageable with said lever for limiting each operative movement thereof to the amount required to position successively arranged views in projecting position, a spring associated with said lever for returning said lever to its normal position after each manual operation thereof, resilient means engageable with said disc for preventing return movement thereof, and a resilient member normally extending across said pocket and pressing the portion of the disc surrounding a view when aligned with said lens means against a wall of said pocket, a portion of the upper edge of said member being bent from the plane of said member whereby the edge of a disc being inserted into said pocket may displace said member toward one side of said pocket.

7. In a projector comprising a frame having a pocket into which to place a transparency-carrying disc of the type having perforations therein for cooperation with feeding means and having evenly spaced, circumferentially arranged transparencies mounted therein; the improved projector comprising a first frame part and a second frame part having juxtaposed portions defining said pocket, separable fastening means uniting said parts together, a thin plate of resilient material mounted on one of said frame parts at one side of said pocket, detaining means struck from said plate and normally projecting across said pocket, said detaining means having projections thereon engageable with the perforations in an inserted disc releasably to resist rotation of said disc, at least one of said detaining means projecting toward the mouth of said slot and having its tip bent toward the plane of said plate whereby said one detaining means may be depressed by a disc being inserted into said pocket.

8. In a projector comprising a frame having a pocket into which to place a transparency-carrying disc of the type having perforations therein for cooperation with feeding means and having evenly spaced, circumferentially arranged transparencies mounted therein; the improved projector comprising a first frame part and a second frame part having juxtaposed portions defining said pocket, separable fastening means uniting said parts together, a thin plate of resilient material mounted on one of said frame parts at one side of said pocket, resilient detents struck from said plate and normally projecting into said pocket, said detents having projections thereon engageable with the perforations in an inserted disc releasably to resist rotation of said disc, at least one of said detents projecting toward the mouth of said slot and having its tip bent toward the plane of said plate whereby the detents may be depressed by a disc being inserted into said pocket, and a second plate of resilient material pivotally mounted on said plate in parallel relation thereto, said second plate comprising a manually engageable portion projecting through a slot in the side of said frame to define an operating lever, and a finger on said operating lever having a claw at its tip engageable with said perforations, said finger being bent from the plane of said second plate and normally spanning said pocket.

9. In a projector comprising a frame having a pocket into which to place a transparency-carrying disc of the type having perforations therein for cooperation with feeding means and having evenly spaced, circumferentially arranged transparencies mounted therein; the improved projector comprising a first frame part and a second frame part having juxtaposed portions defining said pocket, separable fastening means uniting said parts together, a thin plate of resilient material mounted on one of said frame parts at one side of said pocket, and a tongue struck from said plate and normally projecting across said pocket, said tongue having an opening therein with which the transparencies may be aligned, the upper corner of the free end of said tongue being bent toward the plate whereby said tongue may be depressed by a disc being inserted into said pocket.

10. In a projector comprising a frame having a pocket into which to place a transparency-carrying disc of the type having perforations therein for cooperation with feeding means and having evenly spaced, circumferentially arranged transparencies mounted therein; the improved projector comprising a first frame part and a second frame part having juxtaposed portions defining the walls of said pocket, separable fastening means uniting said parts together, a thin plate of resilient material mounted on said frame at one side of said pocket, and a pressure pad struck from said plate and projecting diagonally across said pocket and normally resiliently engaging a portion of the opposite wall thereof, said pressure pad being depressed toward the plane of said plate by an inserted disc and resiliently engaging the disc in the region of the transparency being projected whereby the transparency is maintained in proper relation to the projecting mechanism.

GORDON N. SMITH.

REFERENCES CITED

The following references are of record in the file of this patent:

UNITED STATES PATENTS

| Number | Name | Date |
|---|---|---|
| 1,354,549 | Gilmer | Oct. 5, 1920 |
| 1,364,381 | Kent | Jan. 4, 1921 |
| 1,544,973 | Ghadiali | July 7, 1925 |
| 1,591,881 | Owens | July 6, 1926 |
| 1,965,687 | Chase | July 10, 1934 |
| 2,135,952 | Stephens | Nov. 8, 1938 |
| 2,511,334 | Gruber | June 13, 1950 |